United States Patent [19]

Diveley William R. et al.

[11] Patent Number: 4,520,171

[45] Date of Patent: May 28, 1985

[54] POLYMERIC HINDERED AMINES

[75] Inventors: Diveley William R.; Anthony B. Clayton, both of Wilmington, Del.

[73] Assignee: Hercules Incorporated, Wilmington, Del.

[21] Appl. No.: 375,260

[22] Filed: May 5, 1982

[51] Int. Cl.$^3$ .................... C08F 29/12; C07D 401/07
[52] U.S. Cl. ..................... 525/279; 525/285; 525/328.2; 525/375; 524/86; 524/99; 524/102; 546/187; 546/192; 546/208
[58] Field of Search .......................... 524/86, 99, 102; 525/279, 285, 375, 328.2; 546/208, 192, 187

[56] References Cited

U.S. PATENT DOCUMENTS

| | | | |
|---|---|---|---|
| 3,483,276 | 12/1969 | Mahlman | 525/240 |
| 3,849,373 | 11/1974 | Siegle et al. | 525/328.2 |
| 4,260,689 | 4/1981 | Rody et al. | 524/102 |
| 4,356,307 | 10/1982 | Kelkenberg et al. | 524/94 |

Primary Examiner—John Kight
Assistant Examiner—Kriellion Morgan
Attorney, Agent, or Firm—John E. Crowe

[57] ABSTRACT

Disclosed is a new class of polymeric hindered amine light stabilizers based on maleic anhydride modified polyolefins reacted with tetramethyl piperidine derivatives. These materials are more effective than most of the generally used hindered amine light stabilizers, but due to their higher molecular weights and the polyolefin backbone, they are more compatible with polyolefins.

8 Claims, No Drawings

POLYMERIC HINDERED AMINES

This invention relates to a novel class of polymeric high-molecular weight hindered amines and the use of the same as light stabilizers for polyolefins.

In the commercialization of the polyolefins such as polyethylene, polypropylene and the copolymers of ethylene, propylene, and other olefins, one of the greatest obstacles to overcome has been their limited light stability. In sunlight or any other source of light containing a significant amount of ultraviolet light, the polyolefins degrade rapidly, becoming brittle and strengthless in relatively short order. Fibers, films and molded objects degrade to the point of being totally useless unless the polymer is protected by an effective stabilizer system. A great amount of effort has been devoted to the light stabilization problem with sufficient success that polyolefin films, fibers, and resins are now very substantial items of commerce.

Among the most successful light stabilizers presently in use are the hindered amine compounds, i.e., compounds containing secondary amine groups having two alkyl substituents on each of the carbon atoms attached to an amine group. Examples of a hindered amine compounds which function well as light stabilizers are 2,2,6,6-tetramethyl piperidine (TMP) and certain synthetic compounds of medium molecular weight of similar configuration. Commerically available examples of such synthetic compounds include

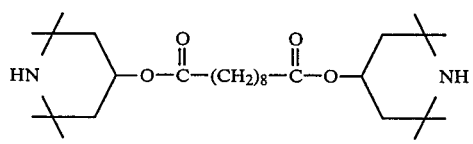

I and

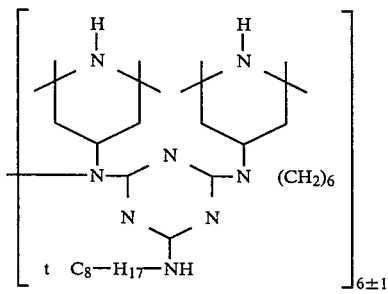

II

These materials function well but for many purposes are not optimum due to their relatively high cost per equivalent of hindered amine group provided to the polymer. Moreover, since their unsubstituted hydrocarbon chains are relatively short, their compatibility with the longer chain polyolefins is not sufficient to prevent exudation thereof from the polymer matrix. Likewise, in textile applications, these hindered amines are subject to being extracted during laundering and dry cleaning. In addition, these compounds have been found to cause dermatitis and they are too toxic to be used in film or molded containers which will be used for packaging food.

It is the purpose of this invention to provide a new class of hindered amines and analogs or derivatives thereof which are useful as light stabilizers for polyolefins but which are less subject to the stated shortcomings of the prior art hindered amine light stabilizers. Another object is to provide olefin polymers and copolymers stabilized by the said high molecular weight hindered amines.

In accordance with the invention, there is provided a novel class of high molecular weight, polymeric hindered amines prepared from maleic anhydride-modified polyolefins and having the general formula selected from the class consisting of

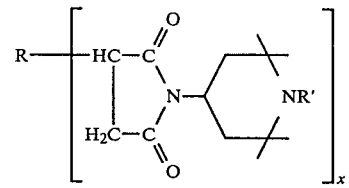

III and

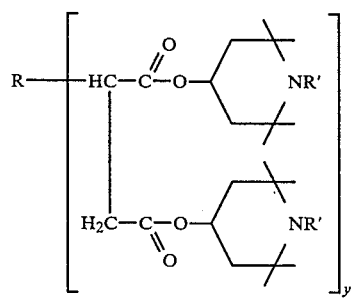

IV wherein R—represents an olefin polymer residue based on ethylene or propylene; R' is H, OH, O·, or O—R"; R" is a lower alkyl or substituted lower alkyl group having at least one hydrogen atom on the carbon attached to the nitrogen atom; and x and y are integers of a size relative to the molecular weight of R such that the total substitution of tetramethyl piperidine residues, is between about 0.2 and 10% by weight based on the total weight of the compound and preferably between about 0.2 and 6% inclusive of 0.2–1%.

It has been theorized that the tetramethyl piperidine acts as a free radical scavenger in effecting light stabilization. The hindered amine moiety is readily converted to an oxygenated free radical form, N-O·, which, in turn, reacts with the free radical polyolefin degradation products. This reaction product is then oxidized to polyolefin nonradical products and the hindered amine product reverts to the oxygenated free radical form whereupon the process starts over.

The hindered amine moiety is sufficiently activated by the methyl groups on the adjacent carbons that a free radical can form on the substituent attached to the nitrogen atom where R' is any of the nonfree radical substituents specified. Thus, each is capable of participating in the light stabilization in the manner explained.

The residue R— in the above formula can represent any olefin polymer residue which is based on a preponderance of ethylene, propylene, or butene-1, and having a valence of x or y. Such residue can be either crystalline (stereoregular) or amorphous (random). Thus, it can be either a high or low density polyethylene residue, a polypropylene residue or a residue of a copolymer of ethylene with butene-1, a residue of a copolymer of ethylene and propylene, a residue of a propylene-butene copolymer or a residue of such a propylene copolymer with an olefin having up to about six carbon atoms. The olefin polymer residue can also contain some unreacted or partially reacted maleic anhydride residue as it is not always required that all of the maleic anhydride modifier be reacted with the hindered amine containing residue. For example, Compound III may contain some groups of the structure.

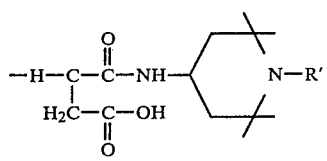

The olefin polymer based hindered amines of the invention represented by formula III, in which R' is hydrogen, are prepared by graft modifying the appropriate polymer backbone with maleic anhydride and thereafter reacting said maleic anhydride modified olefin polymer with 4-amino-2,2,6,6-tetramethyl piperidine. To prepare the compounds of formula IV, in which R' is hydrogen, the maleic anhydride modified olefin polymer is reacted with 4-hydroxy-2,2,6,6-tetramethyl piperidine.

The maleic anhydride-modified polyolefins which form the substrate or carrier for the piperidine residue are known materials containing about 0.2 to 9% by weight of combined maleic anhydride, preferably about 2 to 5%. In fact, one embodiment of these materials in which the polyolefin is either amorphous or crystalline polypropylene is a commercially available product, sold under the trademark "Hercoprime ®" by Hercules Incorporated, Wilmington, Delaware. Polyethylene modified with maleic anhydride is available commercially from Chemplex Company of Rolling Meadows, Ill. under the trademark "Plexar ®". Any polymer or copolymer of ethylene, propylene, or butene-1 can be modified via the maleic anhydride moiety to form the substrate molecule, including polyethylene, polypropylene, ethylene-propylene copolymer, propylene-butene-1 copolymer, or butene-1-ethylene copolymer. The most frequently encountered and the preferred maleic anhydride modified polyolefin is that based on crystalline or steroregular polypropylene.

The preparation of maleic modified polypropylene is described in, inter alia, U.S. Pat. No. 3,483,276. Briefly, the preparation consists of treating the olefin polymer with a material or by a means which will induce the formation of active, free radical sites thereof with which maleic anhydride can react. Active centers can be induced, e.g. by subjecting the polymer to the action of high energy ionizing radiation such as gamma rays, X-rays, or high speed electrons; by contacting it, either as a solid or a solution in a solvent, with a free radical producing material such as dibenzoyl peroxide, dilaurylperoxide, dicumyl peroxide or t-butyl perbenzoate; or by simply milling it in the presence of air. The preferred method is the reaction of the polyolefin with maleic anhydride in solvent solution in the presence of a free radical initiator.

Preparation of the novel polymeric compounds of the invention is accomplished via relatively simple, known chemical reactions. In the case of the compound

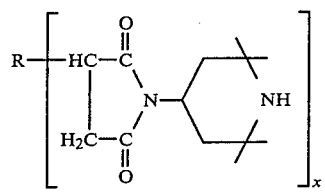

reaction of the maleic-modified polyolefin with 4-amino-2,2,6,6-tetramethyl piperidine is effected by refluxing in the presence of an aromatic solvent, such as, e.g., toluene, chlorobenzene, or xylene and removing water as it is formed. The compound

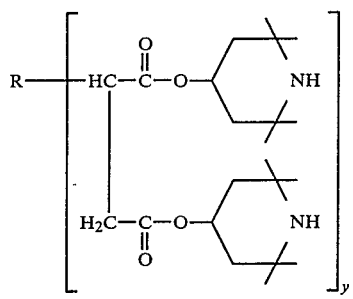

is prepared by refluxing the maleic-modified polyolefin with 4hydroxy-2,2,6,6-tetramethyl piperidine in aromatic solvent under catalytic acid conditions and removing water as it is formed. The acid condition can be created by any acid which is compatible with the aromatic solvent and does not participate in the reaction. Para-toluene sulfonic acid is a preferred acid.

Where the composition comprises a mixture of an olefin polymer and a modified olefin polymer, as above described, it is found useful to utilize modified olefin polymer in an amount sufficient to provide a concentration of tetramethyl piperidine residue between 0.2 and 1.0% by weight.

Preparation of the compounds of the invention is illustrated in the following examples.

EXAMPLE 1

2-[N-(2,2,6,6-Tetramethyl-4-piperidinyl)Succinimidyl] Polypropylene

A commercially available maleic anhydride modified stereoregular polypropylene (Hercoprime G ®-Hercules Incorporated) was purified by refluxing in xylene and recrystallizing to remove water and free maleic anhydride. Combined maleic anhydride content of the purified material was about 2.6%.

A mixture of 49 grams of the purified maleic modified polymer in 450 ml of xylene was agitated and heated to reflux temperature. A solution of 4.69 grams of 4-amino-2,2,6,6-tetramethyl piperidine in xylene was added dropwise over about 15 minutes and reflux was maintained for about seven hours. Water was removed as it formed by azeotropic distillation using a Dean-Stark trap, draining the water from the trap as soon as it was collected.

The product was allowed to cool overnight, at which time a solid, light tan product had precipitated. This product was separated and dried in a forced draft oven. About 48.9 grams was recovered.

EXAMPLE 2

2-[Di-(2,2,6,6-Tetramethyl-4-Piperidinyl)Succinate] Polypropylene

A mixture of 49 gms maleic anhydride modified polypropylene (Hercoprime G ®-Hercules Incorporated—3% combined maleic anhydride), 500 ml of chlorobenzene, 7.07 grams of 4-hydroxy-2,2,6,6-tetramethyl piperidine, and 1 gram of p-toluene sulfonic acid monohydrate was agitated and refluxed for seven hours under a Dean-Stark trap. Water was removed from the trap as the reaction proceeded. After cooling and sitting overnight, the solid product which precipitated was isolated from the mass by vacuum filtration through sintered glass, pressed dry and washed with acetone. The product was dried in air, then in an oven at 50° C. for fifteen minutes. Dry weight of the product was 50.5 grams.

EXAMPLE 3

Example 2 was repeated using xylene as the solvent and refluxing for five hours. About 50.3 grams of product were recovered. IR spectra indicate the presence of some free carboxylic acid but showed that the diester was the overwhelmingly predominant product.

EXAMPLE 4

A mixture of 7 grams of a propylene—butene copolymer (14% $C_4$) containing about 5.1% combined maleic anhydride in 100 ml of xylene was agitated and heated at reflux (136° C.) under a Dean-Stark trap for about 2 hours until all traces of $H_2O$ were removed. The reaction mixture was cooled to about 100° C. and 0.9 gram of 4-amino-2,2,6,6-tetramethyl piperidine in 15 ml of xylene was added dropwise over 15 minutes. The mixture was then agitated and refluxed for ten hours, the water being removed from the trap as it was collected.

The reaction product, a light tan solid, precipitated upon cooling. This was worked up as described in Example 1.

As stated hereinabove, the novel polymeric hindered amine compounds of this invention are highly useful as light stabilizers for polyolefins. While other light stabilizers containing the 2,2,6,6,-tetramethyl piperidine structure are known, the incorporation of that moiety into a maleic anhydride modified polyolefin molecule provides substantially improved light stabilizing ability thereto. Also, the polyolefin backbone is more compatible with the polyolefin matrix to which it is to be added than are many previously known hindered amines. As a result, there is little or no tendency toward exudation or rejection of the stabilizer molecules by the matrix. This, in turn, leads to a significant reduction in extractability as compared to lower molecular weight hindered amines.

Another advantage of the polymeric hindered amine light stabilizers of the invention is improved safety. Some conventional hindered amine light stabilizers have been found to cause irreverible eye irritation in rabbits (BNA Occupational Safety and Health Reporter—May 8, 1980). As a result, operators working with these materials are required to take elaborate precautions against inhalation and against eye exposure to the dust. The materials of this invention, when tested with laboratory rabbits, did not present the same irritation problems. Thus the same safety precautions are not so critical.

In use as light stabilizers for polyolefins, the polymeric hindered amines of the invention are added in amounts such that the tetramethyl piperidine concentration in the total system is equivalent to that heretofore used with conventional monomeric tetramethyl piperidines, about 0.1 to 3% by weight.

EXAMPLE 5

A series of modified polypropylenes prepared as described in the preceding examples were blended with polypropylene using a conventional laboratory extruder, then extruded and cut to molding powder. The molding powder pellets were pressed into ten mil films in a picture frame mold at 200° C.

Films of each of the materials, along with a blank containing no light stabilizer and controls containing commercially available hindered amine light stabilizers, in amount to provide equivalent amounts of tetramethyl piperidine, were subjected to accelerated aging in a Fade-O-Meter. Specimens were tested periodically for flexibility and embrittlement. Average time to failure is recorded in Table 1.

TABLE 1

| Specimen | Additive(1) | Conc. | Average Life (hrs) |
|---|---|---|---|
| Blank | — | — | 80 |
| Control 1 | I | 0.025 pph. | 590 |
| 5-A | Imide | 0.355 pph. | 700 |
| 5-B | diester | 0.185 | 650 |
| 5-C | Imide | 0.215 | 960 |
| Control 2 | II | 0.031 | 510 |
| 5-D | Imide | 0.30 | 840 |

(1) I is compound of formula I, hereinabove.
II is compound of formula II, hereinabove.
5-A Imide is compound of formula III, hereinabove, where R is homopolypropylene residue, R' is H, and combined maleic anhydride content is 3%.
5-B Diester is compound of formula IV hereinabove, where R is homopolypropylene residue, R' is H, and combined maleic anhydride content is 3%.
5-C Imide is compound of formula III, hereinabove, where R is polypropylene-co-butylene residue, R' is H, and combined maleic anhydride content is 5.1%.
5-D Imide is compound of formula III, hereinabove, where R is homopolypropylene reside, R' is H, and combined maleic anhydride content is 3.6%.

From the data it will be apparent that the stabilizers of this invention are more effective than the conventional hindered amine light stabilizers based on tetramethyl piperidine when used in tetramethyl pipridine-equivalent concentrations.

What I claim and desire to protect by Letters Patent is:

1. A hindered amine substituted, maleic anhydride modified olefin polymer having a general formula selected from the class consisting of

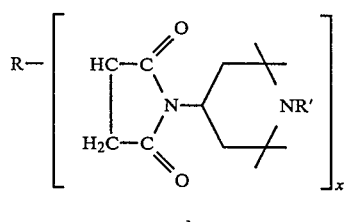

and

-continued

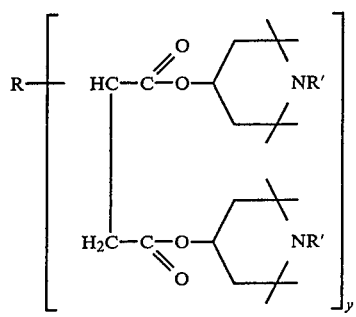

wherein R is an alpha-olefin polymer or copolymer residue and x and y are integers of a size relative to the molecular weight of R such that the total substitution of tetramethyl piperidine residue is between about 0.2 and 10% by weight, based on the total weight of the modified olefin polymer, and R' is H, OH, O', or O—R", where R" is a lower alkyl or substituted lower alkyl group having at least one hydrogen atom on the carbon attached to the nitrogen atom.

2. The product of claim 1 wherein R is a polypropylene residue and R' is H.

3. 2-[N-(2,2,6,6-tetramethyl-4-piperidinyl)succinimidyl] polypropylene.

4. 2-[Di-(2,2,6,6-tetramethyl-4-piperidinyl)succinate] polypropylene.

5. A composition comprising a mixture of an olefin polymer and a modified olefin polymer of claim 1, said modified olefin polymer being present in an amount sufficient that the concentration of tetramethyl piperidine residues in said mixture is between 0.2 and 1.0% by weight.

6. The composition of claim 5 wherein the olefin polymer is polypropylene in both instances.

7. The composition of claim 1 wherein the total concentration of tetramethyl piperidine residue is between about 0.2 and 6.0% by weight.

8. The composition of claim 5 wherein the total concentration of tetramethyl piperidine residue is between about 0.2 and 6.0% by weight.

* * * * *